500
United States Patent Office 2,729,369
Patented Jan. 3, 1956

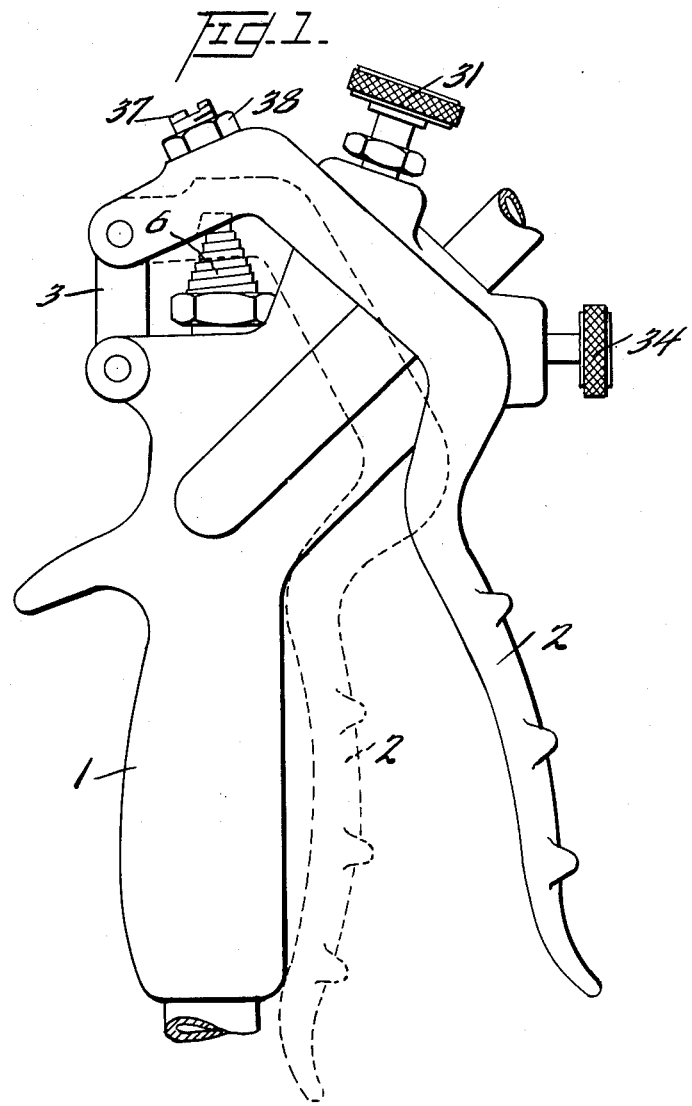

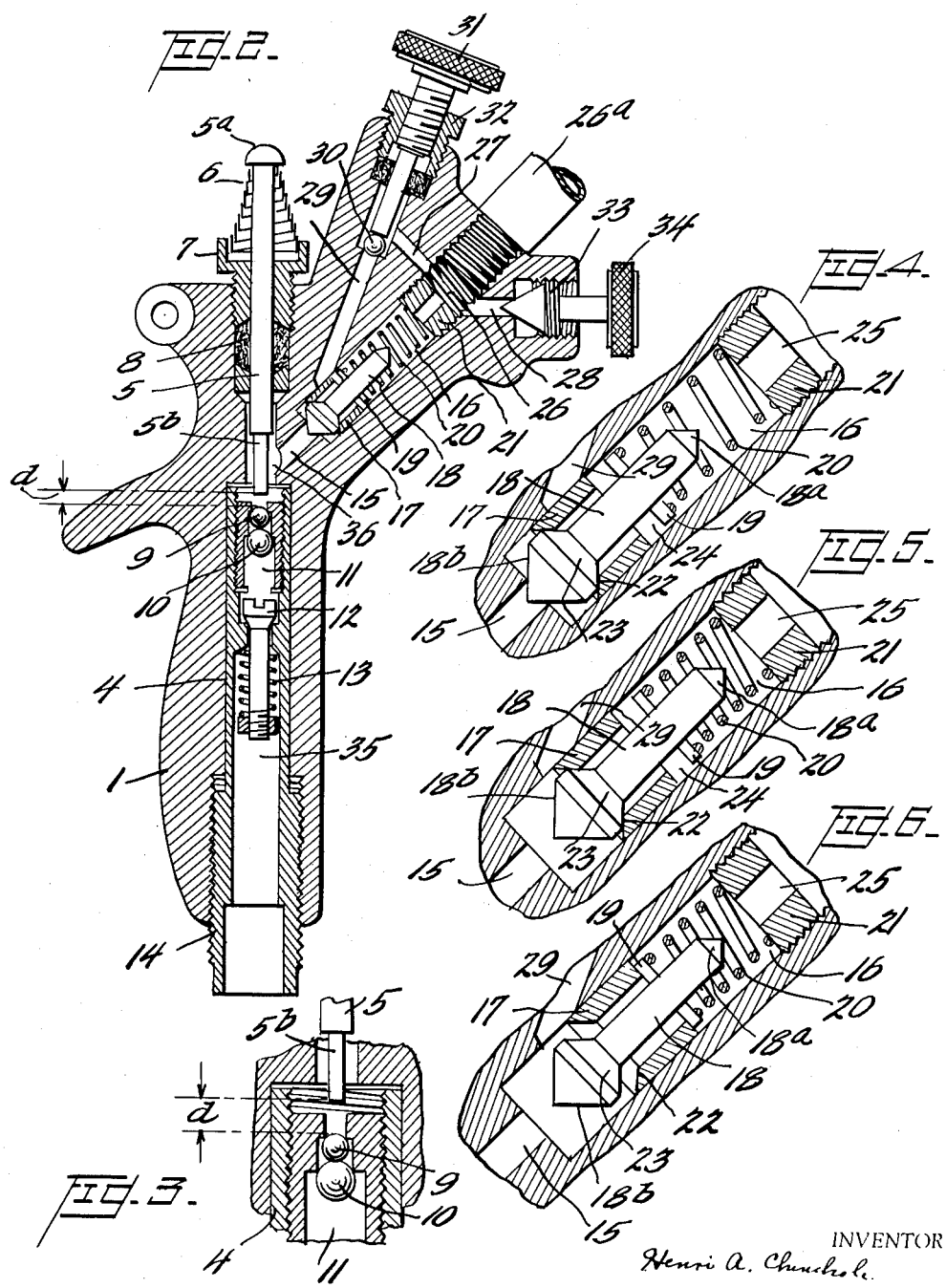

2,729,369
GREASE-GUNS

Henri A. Chinchole, Paris, France

Application January 28, 1952, Serial No. 268,549

Claims priority, application France October 4, 1951

13 Claims. (Cl. 222—394)

Grease-guns for distributing grease at high pressure for the lubrication of automobile underframes and aircraft usually comprise a valve which the pressure of the grease-supply pipe normally tends to close, and the momentary opening of which is occasioned by the action of an opposed plunger manipulated by a tumbler or finger lever. The plunger must therefore exert upon the valve a thrust opposite in direction and at least equal in magnitude to that which is exerted by the grease. During the opening of the valve the delivery of grease is established, and continues until the tumbler is relaxed, whereupon the pressure in the supply pipe automatically re-closes it. Known grease-guns are therefore automatically closing cocks, which are opened instantaneously by manual control.

The high pressures that prevail in the supply pipes are necessary in order to enable the grease to overcome the internal resistance of the parts to be lubricated, in which the passages are always narrow, and furthermore are often partially obstructed by the presence of stale grease forming coom, mixed with particles arising from the wear of the metallic parts.

Although it would seem advantageous to feed the ducts for the supply of grease under as high a pressure as possible, this practice, which has met with extensive favor, has a double disadvantage in use.

The first disadvantage is an excessive consumption of lubricant in all those cases in which the part to be greased does not oppose much resistance to the passage of the grease.

The second disadvantage is that of fatiguing, by excessive pressures, the grease-supply pipes, which are generally India rubber tubes reinforced with a double sheath of braided steel wires. These tubes are very expensive, and their life is considerably shortened when the internal pressure exceeds one-third of their ultimate bursting pressure.

The present invention enables the pipes to be fed as far as the grease-gun under a pressure just sufficient to feed free lubricators, subject to appropriate and easily controlled manual means being provided in the grease-gun for giving the excess pressure that is momentarily necessary for overcoming the resistance of a choked lubricator.

The invention also enables the grease-gun to be equipped, with a view to economizing lubricant, with a device for restricting delivery, that is to say, capable of automatically closing the passage valve when a certain quantity of lubricant has flowed past, thus necessitating a second action upon the tumbler or actuating lever to occasion the delivery of a further quantity, and so on.

This latter point has, however, already been attempted, but at the present time there is no volumetric dosing means giving satisfactory constancy in the successive pulsations and permitting genuine dosing of the distribution.

The grease-gun according to the invention enables waste of lubricant and premature wear of the pipes to be obviated. It is equipped with a volumetric dosing device which automatically effects the closure of the retaining valve when a predetermined quantity of lubricant has just flowed through, and necessitates a fresh action by hand upon the tumbler in order to permit the flow of a further quantity equal to the first.

Furthermore, when the pressure in the delivery pipe proves insufficient to clear an obstinate lubricator, all that is required is to continue manipulating the tumbler in order to cause an excess pressure beyond the grease-gun, between the latter and the point to be lubricated, thereby ultimately effecting the clearing of the choked lubricator.

It is to be observed that the delivery pipe, rigid or articulated, located between the grease-gun and the point to be lubricated is generally of metal, and is consequently capable of standing without any disadvantage the considerable excess pressure to which it may be momentarily subjected.

Finally the grease-gun according to the invention enables the lubricant to be distributed in a continuous flow, when desired, which is advantageous in all those cases in which a substantial charge of grease has to be lodged in the member to be lubricated. This is the case more particularly for the Cardan joints of certain vehicles, or for the lubricators with a reserve of grease utilized in industry or in aviation.

One form of construction of the invention will now be described by way of example with reference to the accompanying drawings, in which:

Figure 1 is a view in elevation of a grease-gun according to the invention, the tumbler or actuating lever being represented in its idle position in full lines and at the end of its stroke in broken lines;

Figure 2 is a section of the grease-gun shown in Figure 1;

Figure 3 is a section on a larger scale of a part of the grease-gun, showing the lower portion of the plunger controlling the opening of the valve to permit the admission of grease, and likewise showing the said valve; and Figures 4, 5 and 6 are sections on a larger scale of a part of the grease-gun showing the piston in different positions in the chamber that encloses it, and likewise showing the plunger that traverses the piston and is provided with its two valves.

The grease-gun illustrated in the drawings comprises a body 1, in which are lodged the members controlling distribution, dosing, excess pressure and direct feeding, and a tumbler 2, connected to the body by two oscillating levers 3.

The body 1 is pierced longitudinally by a central duct 4 having different cross-sectional areas of passage, in which is lodged a manipulating plunger 5, which is actuated downwards by the tumbler 2 and upwards by the expansion of a spirally coiled spring 6, which returns the tumbler to its initial position.

The fluid-tightness of the plunger is ensured by a stuffing-box 7, capable of being screwed to a greater or less extent into the grease-gun body 1, and compressing around the plunger a plastic mass 8 which has to be squeezed in order to oppose any infiltration, while still permitting the normal play of the plunger under the action of the tumbler or of the spring.

The spring 6 bears upon the head $5^a$ of the plunger 5, this head being constituted by a hemisphere designed to fit into a suitable recess in the tumbler.

In the axis of the plunger there are ball valves 9 and 10, which are pressed on to their seats by the pressure of grease in the supply pipe. These valves are two in number, one pushing the other, the smaller one being above the larger, and the seats are made in steps, so designed that the closing or opening of the two valves will be simultaneous.

Below the valves there is a cylindrical chamber 11, the lower end of which is closed by a lift valve 12, controlled by a spring 13. This valve acts in the opposite direction to the double upper valve, that is to say, it permits free admission of the lubricant from the supply pipe into the chamber but opposes its return into the supply pipe.

The grease-gun body 1 is united to the supply pipe through which grease is admitted by a fluid-tight revolving joint, which is not illustrated in the drawing, but which has to be fixed to a part 14.

An outlet channel 15 opens laterally out of the main axial duct, and is continued by a ferrule 26ᵃ (partially represented in the drawing), which is hooked on or coupled to the point to be lubricated. This channel 15 comprises a chamber 16, in which a piston 17 moves, the external diameter of which corresponds, except for clearance, to the internal diameter of the chamber 16. This piston 17 is tubular, and freely surrounds a slide 18, terminating at each end in a cone. This slide 18 receives a pin 19, upon which there acts a spring 20, which is compressed between the pin 19 and a plug 21 screwed to the end of the chamber 16.

The piston 17 is provided with a conical milled seat 22 against which the slide 18 can bear, the slide itself being provided with a frusto-conical portion 23.

A slight interval 24 is provided between the pin 19 and the piston 17 when the latter is in the position illustrated in Figure 4. The plug 21 closing the chamber has an axial passage 25, which a cone 18ᵃ at the rear or outer end of the slide 18 can close in the manner of a valve.

Beyond the plug 21 and in front of the outlet pipe 26ᵃ there is another chamber 26, which is coaxial with the chamber 16, and into which lead two channels 27 and 28.

The channel 27 serves to establish communication between the chamber 26 and the chamber 16 through the medium of a channel 29, this communication being capable of being opened and closed by a ball 30, which is controlled by an external knurled knob 31, which is itself provided with a stuffing-box 32 designed to ensure its fluid-tightness.

The channel 28 likewise communicates with the chamber 26. This channel serves for relieving the chamber 16 when it is felt to be necessary to restore the internal pressure to zero. It is closed by a screw needle 33, likewise controlled from the exterior by a knurled knob 34.

Following the path of the grease, five successive chambers are thus encountered, a chamber 35 to which the grease-supply pipe leads, closed by the valve 12, a chamber 11 containing the stepped ball valves 9 and 10 and the non-return valve 12, a chamber 36 in which the plunger 5 operates, a chamber 16 bounded by the slide 18 and the plug 21, and a chamber 26 into which the channel 27 opens.

This last named chamber 26 is continued to the exterior by the outlet piping 26ᵃ leading to the lubricating valve mounted on the member to be greased, which is not shown in the drawing.

The tumbler 2 (Figure 1) is equipped with a screw 37, the penetration of which serves to regulate the penetration of the plunger 5. A nut 38 serves to lock this screw in its adjusted position.

Before proceeding to describe the operation of the device it should be observed that the plunger 5 should be so adjusted that the lower end 5ᵇ of this plunger will be separated from the first valve 9 by an interval $d$ which corresponds to a fraction of the total stroke of the tumbler 2.

When the grease-gun body 1 is united to the supply piping the grease under pressure enters the chamber 35, and then the chamber 11 by raising the conical valve 12 against the action of the spring 13. The pressure of the grease presses the ball valves 9 and 10 firmly on to their seats. The grease-gun is therefore closed, and there is no delivery.

The knurled knobs 31 and 34 being screwed up tight, the two outlet channels 27 and 28 are shut off, and the chamber 26 has no entrance except from the chamber 16, and no outlet other than the grease outlet pipe 26ᵃ. The channels and the chambers are assumed to be full of lubricant.

If at this moment the tumbler 2 is actuated it compresses the spring 6, and the plunger 5 descends a distance $d$, until it encounters the ball valve 9. The pushing in of the plunger 5 through the distance $d$ has introduced into the chamber 36 a volume of metal equal to the cross-sectional area of the plunger shank 5 multiplied by the length $d$; while the tumbler has accomplished a portion of its angular trajectory.

At this juncture the lower end 5ᵇ of the plunger 5 comes into contact with the valve 9, and the balls 9 and 10 are moved slightly away from their seats. There is therefore a flow of grease through the displaced valves, and this flow is in no way hampered by the conical valve 12, which remains open normally during the delivery.

After passing the ball valves the lubricant enters the chamber 36, and then passes into the chamber 16 by pushing back the slide 18, which fits into the conical shoulder of the piston 17, thus forming a homogeneous block completely shutting off the chamber 16.

Under the action of the pressure of the grease, the unit consisting of the slide 18 and the piston 17 is displaced, pushing towards the outlet 26ᵃ the grease that was already contained in the chamber 16, with a pressure equal to the feed pressure, that is to say, to the pressure prevailing in the supply pipe.

The spring 20 is compressed by the displacement of the slide 18, the cone 18ᵃ of which finally shuts off the channel 25 of the plug 21. At this moment delivery stops, and equilibrium of pressure is established between the chambers 35, 11, 36 and 16, the chamber 26 being at zero, since it is assumed that the charge of grease has been injected without obstacle into the member to be greased.

Delivery having been arrested, the tumbler 2 is now released, and returns, under the action of the spring 6, to its initial position. The plunger, re-ascending, liberates the valves 9 and 10, which return into contact with their seats on account of the depression created in the chamber 36 by the retraction of the plunger 5. At this juncture the chambers 36 and 16 are isolated from the chambers 11 and 26.

From the fact of the re-ascent of the plunger, the aggregate volume of the isolated chambers 36 and 16 is increased by the volume of metal previously introduced during the stroke $d$, and in these two chambers a progressive decompression is produced which liberates the spring 20 and permits it to push the slide 18 back to its initial position.

In this movement the piston 17 is slightly detached from the slide 18 by taking up the clearance 24 left by construction between the piston 17 and the pin 19. An equal space then exists between the frusto-conical surface 23 on the slide 18 and the milled shoulder 22 of the piston 17, through which the grease can flow, thus permitting the slide to traverse its return path.

The mass of grease in the chamber 16, which was on the up-stream side of the slide 18, is now on the down-stream side of the slide when the latter has returned to its initial position, and the cycle can re-commence, the chamber 16 again containing a charge of grease of definite volume ready to be injected.

Assuming the knob 31 to be unscrewed, the ball 30 is no longer pressed onto its seat, and permanent communication is established between the chamber 26 and the reception chamber 16. If the tumbler is then kept pressed, the passage of grease takes place continuously through the chambers 35, 11, 36, the channel 29, the channel 27, the chamber 26 and the outlet pipe 26ª. The grease-gun is then operating like an ordinary grease-gun.

In the foregoing description it has been assumed that the outlet at 26ª was free, but if the lubricator is choked, the chamber 26, which is normally open, is in this case closed, since flow cannot take place so long as the lubricator remains closed. In this case lubricant accumulates in this chamber 26, where the pressure progressively rises until equilibrium is attained with the supply pressure. At this juncture the spring 13, being free to act, presses the valve 12 onto its seat, thus closing the chamber 11 at its lower end.

If the tumbler 2 is then actuated, utilizing this time not a fraction of its stroke but the whole of it, the plunger 5 continues its descent, pushing before it the ball valves 9 and 10, thus putting the chambers 11 and 36 into communication.

As the plunger descends into the chambers 11 and 36, the volume of metal thus introduced diminishes the total volume of these chambers, thus raising the pressure therein. The rise of pressure in the chambers 11 and 36 occasions the opening of the cone valve 18ᵇ of the slide 18. A certain quantity of lubricant enters the chambers 16 and 26 (this latter being by hypothesis choked at the outlet), and the pressure rises in the chambers 11, 36, 16 and 26 until the plunger 5 reaches its lowest point, corresponding to complete closure of the tumbler. In this position of equilibrium the spring 20, acting upon the slide-and-piston unit 18, 17, will press the cone 18ᵇ onto its seat, thus shutting off the channel 15.

When the plunger re-ascends, a depression is created in the chambers 11 and 36, which has the result of applying the slide 18 to its seat, thus opposing the return of grease from the chamber 16 to the chambers 11 and 36. The partial vacuum thus created in the chambers 11 and 36 enables the valve 12 to lift so as to feed the chamber 11. This feeding proceeds until the ball valves are again resting upon their seats. At this moment the chambers 11 and 36 are in equilibrium with the pressure in the supply pipe, but the chambers 11 and 26 are maintained at a raised pressure.

The cycle can re-commence, and at each manipulation of the tumbler a certain quantity of grease is introduced into the chambers 16 and 36. As grease is an almost incompressible substance, the successive quantities introduced at each stroke of the tumbler give rise, in the chambers 16 and 26, the total volume of which is very small, to a considerable excess pressure, which has no limit other than the manual strength of the operator for manipulating the tumbler.

It is clear that this quantity of grease can be made larger or smaller by increasing or diminishing the cross-sectional area of the plunger 5. This cross-sectional area should not, however, fall below a critical value which is conditioned by the total volume of the chambers 11 and 36, which by construction will have to be as limited as possible.

The tumbler consequently comprises two different half-strokes, separated by the point of opening of the valves. Before this opening it is the pre-stroke of decompression serving for dosed or continuous delivery; whereas the second or super-compression stroke serves to force successive quantities of grease into the closed space of a choked lubricator, until the rise of pressure ends by clearing it.

It is likewise to be observed that the final super-compression is determined only by the number of actions upon the tumbler and is completely independent of the primary feeding pressure in the supply pipe. This pressure may therefore be reduced as much as may be requisite for the purpose of preserving the durability of the tubes, since it is known that a considerable super-compression can be obtained at any moment when the need for it is experienced.

Having thus described the invention, what is claimed as new and desired to be secured by Letters Patent is:

1. A grease gun comprising a body traversed by a duct communicating at one end with a pipe for supplying grease under pressure and at the other end with a pipe for discharging grease, a manually operated tumbler controlling the flow of grease through said duct, a plunger actuated by said tumbler, a spring-controlled valve adapted to be lifted off its seat by the pressure of the grease in the supply pipe, a valve adapted to rest on its seat by the pressure of the grease that has passed the first valve and to be removed from its seat by the plunger actuated by the tumbler, discharge valve means including a slide and two valves rigid therewith disposed in said duct in a chamber communicating with the discharge pipe, a tubular piston disposed in said chamber about a shank of said slide and between the two valves carried by said slide, means having a grease passage and disposed in said duct between said discharge pipe and said chamber and being formed with a discharge valve seat, both of said slide valves acting in the same direction and one capable of coming into contact with the discharge valve seat and the other adapted to close the orifice of the piston in response to the manual operation of said tumbler, and a spring coupled to said slide and adapted to push the slide so as to disengage the slide from its discharge valve seat.

2. A grease-gun as claimed in claim 1, in which the plunger actuated by the tumbler enters the duct in the body of the grease-gun beyond the valve which is applied to its seat by the supply pressure of the grease, and acts directly upon this valve.

3. A grease-gun as claimed in claim 1, in which the piston is formed with a conical valve seat for the valve that closes the orifice of the said piston.

4. A grease-gun as claimed in claim 1, comprising means capable of exterior manipulation, and means including an auxiliary discharge orifice which is normally closed by said exterior means.

5. A grease-gun as claimed in claim 1, comprising a spring coupled to said plunger and applying a force to said plunger tending to move it away from the valve the opening of which it normally controls.

6. A grease-gun as claimed in claim 1, in which the valve pressed onto its seat by the supply pressure of grease and capable of being pushed away from its seat by the plunger comprises two balls in which the second one in the direction of flow of the grease is smaller than the first and in which both bear upon seats of similarly decreasing sizes.

7. A grease-gun as claimed in claim 1, in which a by-pass conduit is provided for conveying grease directly from the valve pressed onto its seat by the grease-supply pressure to the discharge pipe, and an externally controlled shut-off device for the said conduit.

8. A grease-gun as claimed in claim 1, in which the length of the plunger actuated by the tumbler and controlling the opening of its valve is so dimensioned that when the tumbler is released the end of the said plunger will be at a certain distance from the said valve, and that consequently a certain volume of this plunger will be introduced into the duct in the body of the grease-gun before the plunger reaches the valve and causes it to open.

9. A grease-gun as claimed in claim 6, in which the plunger actuated by the tumbler enters the duct in the body of the grease-gun beyond the valve which is applied to its seat by the supply pressure of the grease, and acts directly upon this valve.

10. A grease-gun as claimed in claim 6, comprising a pin coupled to the shank of said slide in which the spring that repels the slide bears upon the discharge valve seat and acts upon said pin.

11. A grease-gun as claimed in claim 7 comprising a screw threaded plunger displaceable in an internal screw thread, and in which the shut-off device provided on the by-pass conduit comprises a ball valve the closing of which can be controlled by the screw threaded plunger.

12. A grease-gun as claimed in claim 8, in which the stroke of the tumbler and the length of the plunger that it controls are so dimensioned that the plunger occasions the opening of its valve when the tumbler is at about the middle of its stroke.

13. In a grease-gun having a body traversed by a duct communicating at one end with a pipe for supplying grease under pressure and at the other end with a discharge pipe and in which the flow of grease is controlled by a manually operated tumbler which actuates means for raising the delivery pressure above the supply pressure and having means for automatically shutting off the grease outlet when a predetermined quantity of grease has been delivered, the improvement comprising a spring-controlled valve adapted to be lifted off its seat by the pressure of the grease in the supply pipe, a valve adapted to be pressed onto its seat by the pressure of the grease that has passed the first valve and to be pushed off its seat by the plunger actuated by the tumbler, discharge valve means including a slide and two valves rigid therewith disposed in said duct in a chamber communicating with the discharge pipe, a tubular piston disposed in said chamber about the shank of said slide and between the two valves carried by said slide, a plug having a grease passage disposed in said duct between said discharge pipe and said chamber and being formed with a discharge valve seat, valves acting in the same direction and one capable of coming into contact with the discharge valve seat of said plug and the other adapted to close the orifice of the piston whereby the closing of said orifice in response to manual operation of said tumbler is effective to close the discharge-valve seat by its associated valve, and a spring coupled to said slide and adapted to push the slide so as to disengage the discharge-valve seat from its slide.

References Cited in the file of this patent
UNITED STATES PATENTS

| | | |
|---|---|---|
| 1,686,309 | Zabriskie | Oct. 2, 1928 |
| 1,819,381 | Palmer | Aug. 18, 1931 |
| 1,991,595 | Creveling | Feb. 19, 1935 |
| 1,995,377 | Creveling | Mar. 26, 1935 |
| 2,016,809 | Bystricky | Oct. 8, 1935 |
| 2,042,970 | Thomas | June 2, 1936 |
| 2,056,250 | Bystricky | Oct. 6, 1936 |
| 2,546,258 | Farrell | Mar. 27, 1951 |
| 2,579,754 | Pacey | Dec. 25, 1951 |